United States Patent
Shen et al.

(10) Patent No.: US 11,758,111 B2
(45) Date of Patent: Sep. 12, 2023

(54) 3D LIDAR SYSTEM USING A DICHROIC MIRROR FOR AUTONOMOUS DRIVING VEHICLES

(71) Applicant: Baidu USA LLC, Sunnyvale, CA (US)

(72) Inventors: Yaoming Shen, Milpitas, CA (US); Yang Han, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 326 days.

(21) Appl. No.: 15/796,546

(22) Filed: Oct. 27, 2017

(65) Prior Publication Data
US 2019/0132572 A1 May 2, 2019

(51) Int. Cl.
*H04N 13/271* (2018.01)
*G01S 7/481* (2006.01)
*G01S 17/86* (2020.01)
*G01S 17/931* (2020.01)
*G06V 20/40* (2022.01)
(Continued)

(52) U.S. Cl.
CPC .......... *H04N 13/271* (2018.05); *G01S 7/4811* (2013.01); *G01S 17/86* (2020.01); *G01S 17/931* (2020.01); *G05D 1/0251* (2013.01); *G06V 20/41* (2022.01); *G02B 7/04* (2013.01); *G02B 26/10* (2013.01); *G02B 27/141* (2013.01); *H04N 2013/0081* (2013.01);
(Continued)

(58) Field of Classification Search
CPC ..... H04N 13/271; G01S 17/86; G05D 1/0251
See application file for complete search history.

(56) References Cited

U.S. PATENT DOCUMENTS 9,598,076 B1 3/2017 Jain et al.
10,126,411 B2 * 11/2018 Gilliland ............... G01S 7/4814
(Continued)

FOREIGN PATENT DOCUMENTS

CN 111366940 A 7/2020
CN 111480094 A 7/2020
(Continued)

OTHER PUBLICATIONS

Chen et al., "A Novel Stereo Object Segmentation Algorithm Using Disparity and Temporal Information," Journal of Applied Science and Engineering, vol. 16, No. 3, pp. 225-232 (2013).*
(Continued)

*Primary Examiner* — Michael J Hess
(74) *Attorney, Agent, or Firm* — WOMBLE BOND DICKINSON (US) LLP

(57) ABSTRACT

In one embodiment, a three-dimensional LIDAR system includes a light source (e.g., laser) to emit a light beam (e.g., a laser beam) to sense a physical range associated with a target. The system includes a camera and a light detector (e.g., a flash LIDAR unit) to receive at least a portion of the light beam reflected from the target. They system includes a dichroic mirror situated between the target and the light detector, the dichroic mirror configured to direct the light beam reflected from the target to the light detector to generate a first image, wherein the dichroic mirror further directs optical lights reflected from the target to the camera to generate a second image. The system includes an image processing logic coupled to the light detector and the camera to combine the first image and the second image to generate a 3D image.

12 Claims, 8 Drawing Sheets

(51) Int. Cl.
  *G05D 1/02* (2020.01)
  *G02B 7/04* (2021.01)
  *G02B 26/10* (2006.01)
  *G02B 27/14* (2006.01)
  *H04N 13/00* (2018.01)

(52) U.S. Cl.
  CPC ............ *H04N 2013/0092* (2013.01); *H04N 2213/001* (2013.01); *H04N 2213/003* (2013.01)

(56) References Cited

U.S. PATENT DOCUMENTS

| | | | | |
|---|---|---|---|---|
| 2012/0044476 | A1* | 2/2012 | Earhart | G01S 3/7867 356/4.01 |
| 2013/0278716 | A1 | 10/2013 | Kennedy et al. | |
| 2015/0163558 | A1 | 6/2015 | Wheatley | |
| 2017/0061632 | A1 | 3/2017 | Lindner et al. | |
| 2018/0107221 | A1* | 4/2018 | Droz | G05D 1/024 |
| 2018/0139431 | A1* | 5/2018 | Simek | H04N 13/232 |
| 2019/0001976 | A1* | 1/2019 | Liu | B60W 30/16 |
| 2019/0052844 | A1* | 2/2019 | Droz | G01S 17/89 |
| 2019/0132572 | A1 | 5/2019 | Shen et al. | |

FOREIGN PATENT DOCUMENTS

| | | |
|---|---|---|
| DE | 102010055865 | 7/2011 |
| EP | 3477338 A1 | 5/2019 |
| JP | 2002-369049 | 12/2002 |
| JP | 2003-272061 | 9/2003 |
| JP | 2004-028727 A | 1/2004 |
| JP | 2005-216160 | 8/2005 |
| JP | 2005-332404 A | 12/2005 |
| JP | 2006-509211 | 3/2006 |
| JP | 2006-317303 A | 11/2006 |
| JP | 2006-323693 | 11/2006 |
| JP | 2010-035168 | 2/2010 |
| JP | 2012-123492 A | 6/2012 |
| JP | 2014-072586 A | 4/2014 |
| JP | 2014-203207 A | 10/2014 |
| JP | 2017-073755 | 4/2017 |
| KR | 10-2014-0028539 A | 3/2014 |
| KR | 10-2015-0068545 A | 6/2015 |
| WO | 2016/002406 A1 | 1/2016 |

OTHER PUBLICATIONS

Hackett et al., "Multi-Sensor Fusion: A Perspective," 1990. Teaches fusion of data from multiple sensors sensing a single property is typically handled using averaging (Section 1: Introduction).*

Badino et al., Integrating LIDAR into Stereo for Fast and Improved Disparity Computation, 3D Imaging, Modeling, Processing, Visualization, Transmission (3DIMPVT) Hangzhou, China, May 16-19, 2011.*

Shinsaku Hiura et al., "By real-time range image sensor Multi-view observation of moving body." Techinical report of IEICE, Apr. 24, 1995, vol. 95, No. 16, pp. 35-10, 8 pages.

* cited by examiner

3D LIDAR SYSTEM USING A DICHROIC MIRROR FOR AUTONOMOUS DRIVING VEHICLES

TECHNICAL FIELD

Embodiments of the present invention relate generally to operating autonomous vehicles. More particularly, embodiments of the invention relate to a light detection and range (LIDAR) device for operating an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR techniques have been widely utilized in military, geography, oceanography, and in the latest decade, autonomous driving vehicles. Apart from others, LIDAR's applications in autonomous driving vehicles have been hindered by the high cost. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers, can be rapidly and repeatedly scanned across a scene to provide continuous real-time information on distances to reflective objects in the scene.

Traditional mechanical LIDAR devices with motorized rotating spinners have a 360 degrees horizontal field of view, while a camera has a much smaller horizontal field of view. Synchronizing the field of view of LIDAR devices with cameras requires additional computational power. Furthermore, a deviation in LIDAR spin speeds from time to time may lead to mismatches in image synchronization.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
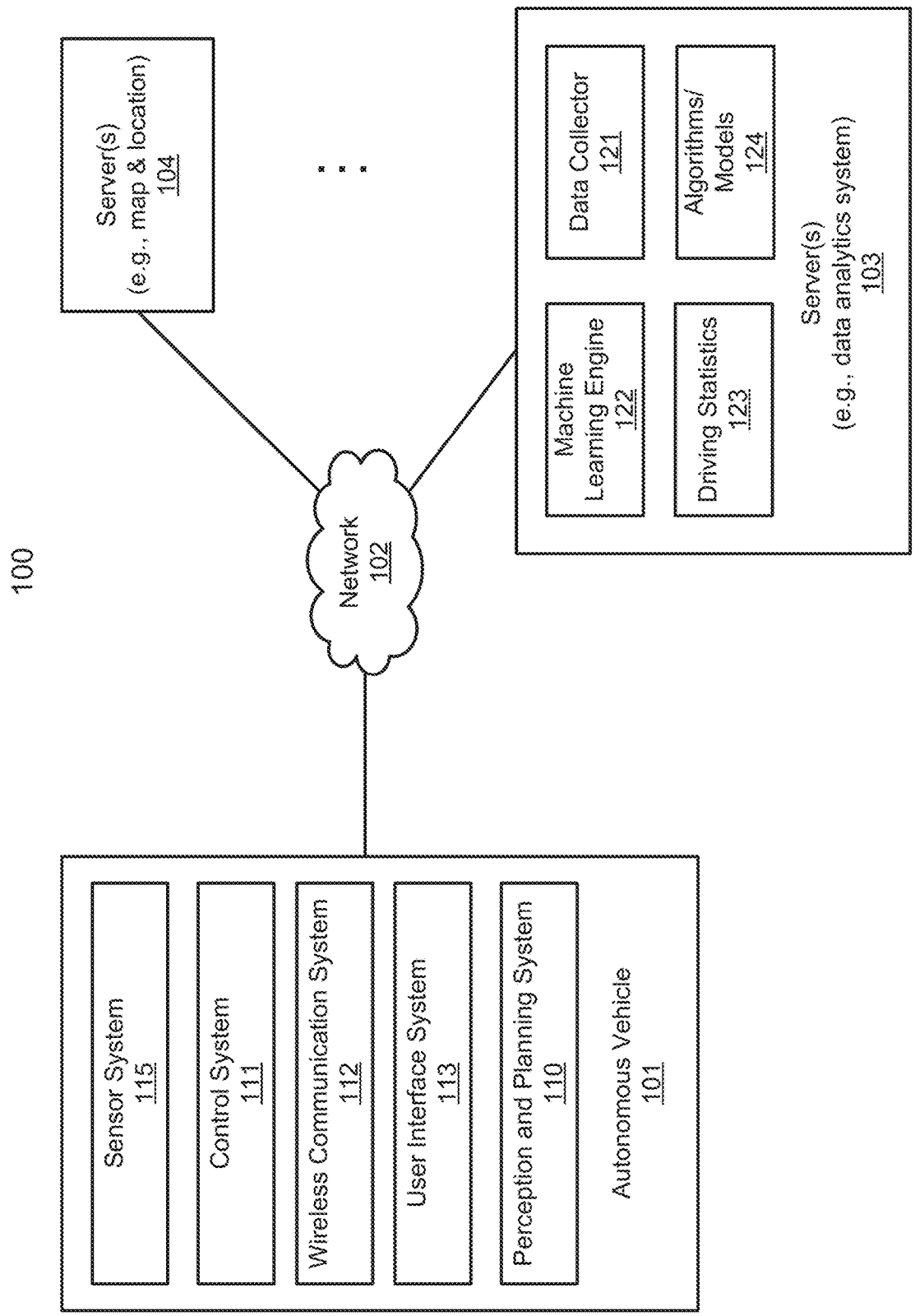
FIG. 1 is a block diagram illustrating a networked system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a three-dimensional (3D) LIDAR system includes a light source (e.g., laser) to emit a light beam (e.g., a laser beam) to sense a physical range associated with a target. The system includes a first camera and a light detector (e.g., a flash LIDAR unit) to receive at least a portion of the light beam reflected from the target. The system includes a dichroic mirror situated between the target and the light detector, the dichroic mirror configured to direct the light beam reflected from the target to the light detector to generate a first image, wherein the dichroic mirror further directs optical lights reflected from the target to the first camera to generate a second image. Optical lights refer to the lights that are visible to human and can be captured by ordinary cameras, while the light beam captured by a LIDAR sensor is typically invisible to human and cannot be captured by cameras. The system includes image processing logic coupled to the light detector and the first camera to combine the first image and the second image to generate a 3D image without having to perform an image synchronization. The first image may contain distance information describing a distance between the LIDAR sensor and the target (e.g., vertical dimension) and the second image may contain color information concerning the target (e.g., 2D horizontal dimensions). By combining the first image and the second image, the combined image would include both the distance and color information that collectively describing the target in 3D.

In one embodiment, the 3D image is generated by mapping one or more pixels of the first image directly onto one or more pixels of the second image, where a pixel density count of the first image is different from a pixel density count of the second image. In another embodiment, the 3D image is generated by applying a semantic segmentation algorithm to the second image to classify objects perceived in the second image and mapping one or more pixels of the first image indirectly onto one or more pixels of the second image based on the perceived objects.

In one embodiment, the 3D LIDAR system further includes a zoom lens situated between the target and the dichroic mirror to enlarge or reduce a perceived field of view of the light detector. In one embodiment, the 3D LIDAR system further includes a scanning component situated between the target and the dichroic mirror to increase a pixel density count of the first image. In one embodiment, the 3D LIDAR system further includes a second camera situated relative to the first camera to form a stereo camera pair, the second camera to generate a third image to perceive a disparity from the second image. In another embodiment, the disparity is perceived by applying a stereo segmentation algorithm to the second and the third images.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
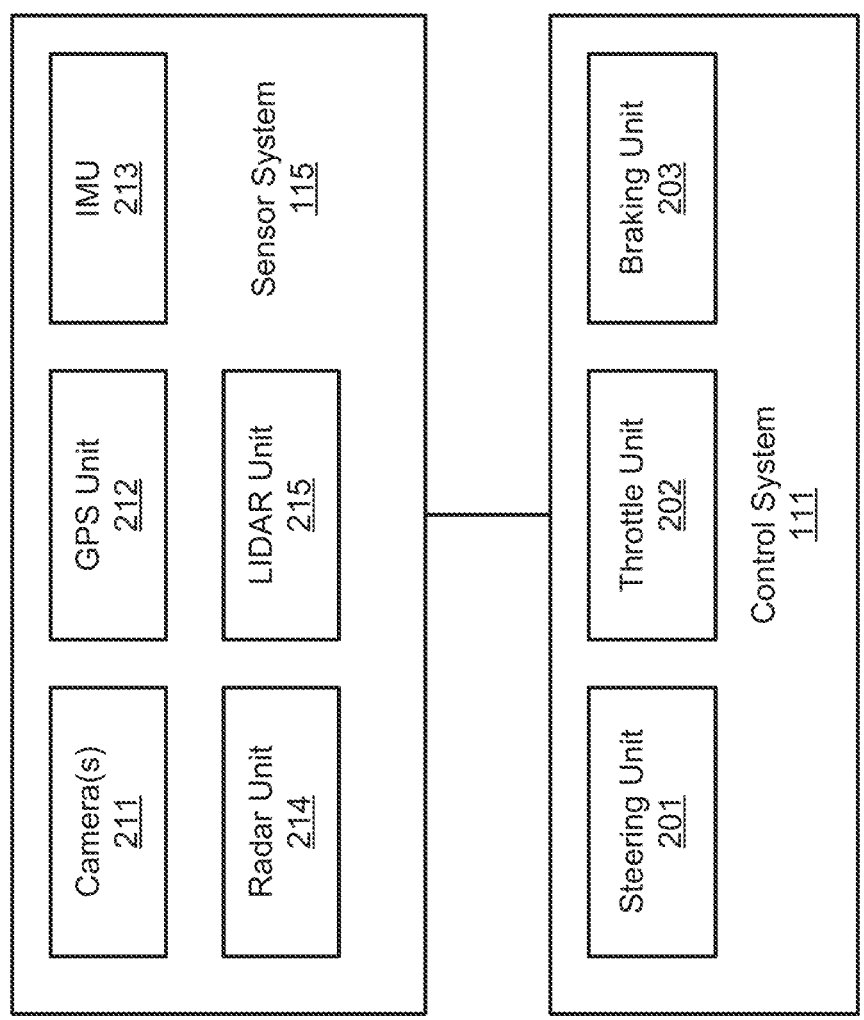
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. Algorithms/models 124 may be specifically designed or configured for a particular vehicle or a particular type of vehicles. Algorithms/models 124 may then be uploaded onto the associated ADVs for driving the ADVs at real-time. Algorithms/models 124 may be utilized to plan, route, and control the ADVs under a variety of driving scenarios or conditions. For example, algorithms/models 124 includes a semantic segmentation algorithm to detect objects for an RGB (red, green, and blue) image perceived by a camera unit. Algorithms/models 124 may further include an algorithm to merge and synchronize images produced by light detectors and cameras.

Figure 3:
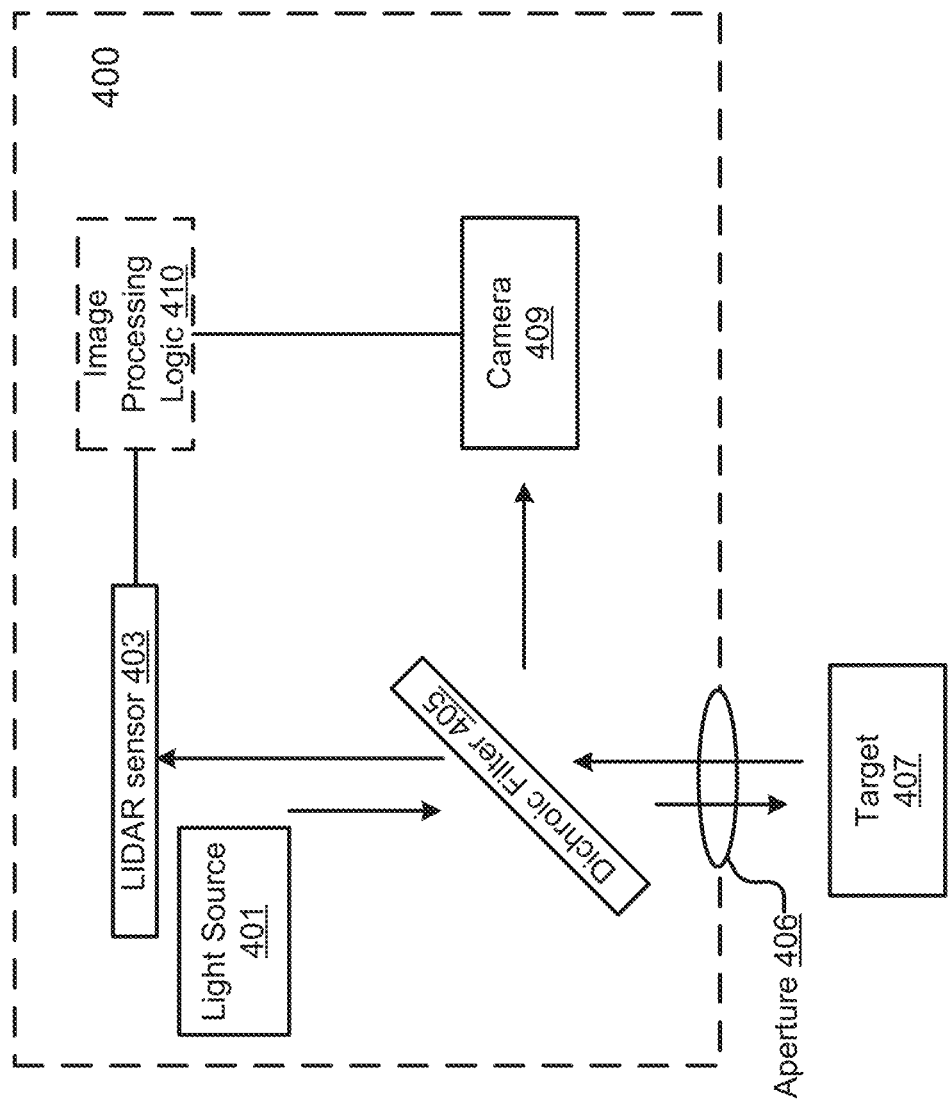
FIG. 3 is a diagram illustrating an example of a LIDAR system used with an autonomous vehicle according to one embodiment.

FIG. 3 is a diagram illustrating an example of a LIDAR system used with an autonomous vehicle according to one embodiment. LIDAR device 400 may be implemented as part of LIDAR unit 215 and/or camera(s) 211 of FIG. 2. LIDAR device 400 includes a LIDAR unit and a camera, to sense objects and capture images of a target environment of the autonomous vehicle. Referring to FIG. 3, in one embodiment, LIDAR device 400 includes light source 401 (e.g., laser), LIDAR sensor 403 (e.g., a light detector), dichroic filter 405 (e.g., a dichroic mirror), optional aperture 406, camera 409, and image processing logic 410. Light source 401 generates and directs a laser beam to target 407 through aperture 406.

A dichroic filter, thin-film filter, or interference filter is a very accurate color filter used to selectively pass light of a small range of colors while reflecting other colors. By comparison, dichroic mirrors and dichroic reflectors tend to be characterized by the color(s) of light that they reflect, rather than the color(s) they pass. Dichroic filters can filter light from a white light source to produce light that is perceived by humans to be highly saturated (intense) in color. Dichroic reflectors are commonly used behind a light source to reflect visible light forward while allowing the invisible infrared light (radiated heat) to pass out of the rear of the fixture, resulting in a beam of light that is literally cooler (of lower thermal temperature). Such an arrangement allows a given light to dramatically increase its forward intensity while allowing the heat generated by the backward-facing part of the fixture to escape.

Referring back to FIG. 4, dichroic filter 405 directs (e.g., pass through) a reflection of the light beam from target 407 to LIDAR sensor 403 to generate a first image. Dichroic filter 405 also directs (or reflects) optical lights to camera 409 to generate a second image. Since the reflected light beam and optical lights both pass through the same aperture 406, therefore, camera 409 shares the same field of view with LIDAR sensor 403 such that the field of view of the first and the second images requires minimum or no image synchronization. In one embodiment, LIDAR sensor 403 and camera 409 are mounted to fixed locations with respect to each other. As a result, the images captured by LIDAR sensor 403 and camera 409 are automatically synchronized (e.g., with a known or fixed relationship).

In another embodiment, image processing logic 410 is coupled to LIDAR sensor 403 and camera 409 to generate a 3D image based on the already synchronized outputs of the camera and the LIDAR sensor, e.g., the first and the second images. Note, a dichroic filter (or mirror) can spectrally separate light by transmitting and reflecting light as a function of wavelength. For example, dichroic mirror 405 with a cutoff wavelength of approximately 800 nanometers (nm) can be designed to pass through light with frequency bands higher than approximately 850 nm (e.g., a 905 nm laser beam generated by light source 401 will pass through the dichroic mirror) while reflecting light with frequency bands less than approximately 750 nm (e.g., visible light approximately 400-700 nm in wavelength will be reflected).

In one embodiment, light source 401 and LIDAR sensor 403 may be an integrated unit, e.g., a flash LIDAR unit. In another embodiment, image processing logic 410 is external to LIDAR device 400. For example, sensor system 115 of FIG. 2 may include image processing logic 410 to generate a 3D image based on the outputs of camera 409 and LIDAR sensor 403. Alternatively, image processing logic 410 may be implemented as a software and/or hardware module of perception and planning system 110. In one embodiment, LIDAR device 400 optionally includes a zoom lens situated in between dichroic filter 405 and target 407 to enlarge or reduce a field of view of the LIDAR sensor. In another embodiment, one or more dichroic filters or mirrors may be used to direct one or more light beams (e.g., a 905 nm and a 1550 nm light beams, etc.) to one or more LIDAR sensors. For example, a first dichoric filter may direct a first light beam of a first wavelength to a first LIDAR sensor, and a second dichroic filter may direct a second light beam of a second wavelength to a second LIDAR sensor. The different wavelength lasers or light beams have different sensitivity factors to water and airborne particles, thus, a multiple sensors setup can improve reliability of LIDAR device 400.

In another embodiment, a scanning component can be optionally added in between dichroic filter 405 and target 407 to adjust a field of view of the LIDAR device. The scanning component can enable LIDAR sensor 403 to interleave sensed data to increase a resolution (an inherent limitation) of the LIDAR device. For example, a flash LIDAR unit with output resolution of 8 by 32 pixels can interleave data to increase resolution or the pixel count to 16 by 32 pixels. In one embodiment, placements of LIDAR sensor 403 and camera 409 can be adjusted or swapped by adopting a customized optical filter in place of the dichroic filter, e.g., an optical filter to reflect infrared or near infrared light (e.g., approximately 905 nm) and pass through optical light in the visible light spectrum.

In one embodiment, LIDAR device 400 includes a LIDAR device (e.g., flash LIDAR) with approximately 45-60 degrees field of view. An ADV, such as ADV 101 of FIG. 1, can place multiple (e.g., six or more) LIDAR devices surrounding the exterior of the ADV for a 360 degree horizontal field of view. In one embodiment, LIDAR device 400 includes a micro electro and mechanical systems (MEMS) based scanning LIDAR, e.g., LIDAR with MEMS mirrors to sense by scanning reflected light beams.

Figure 4:
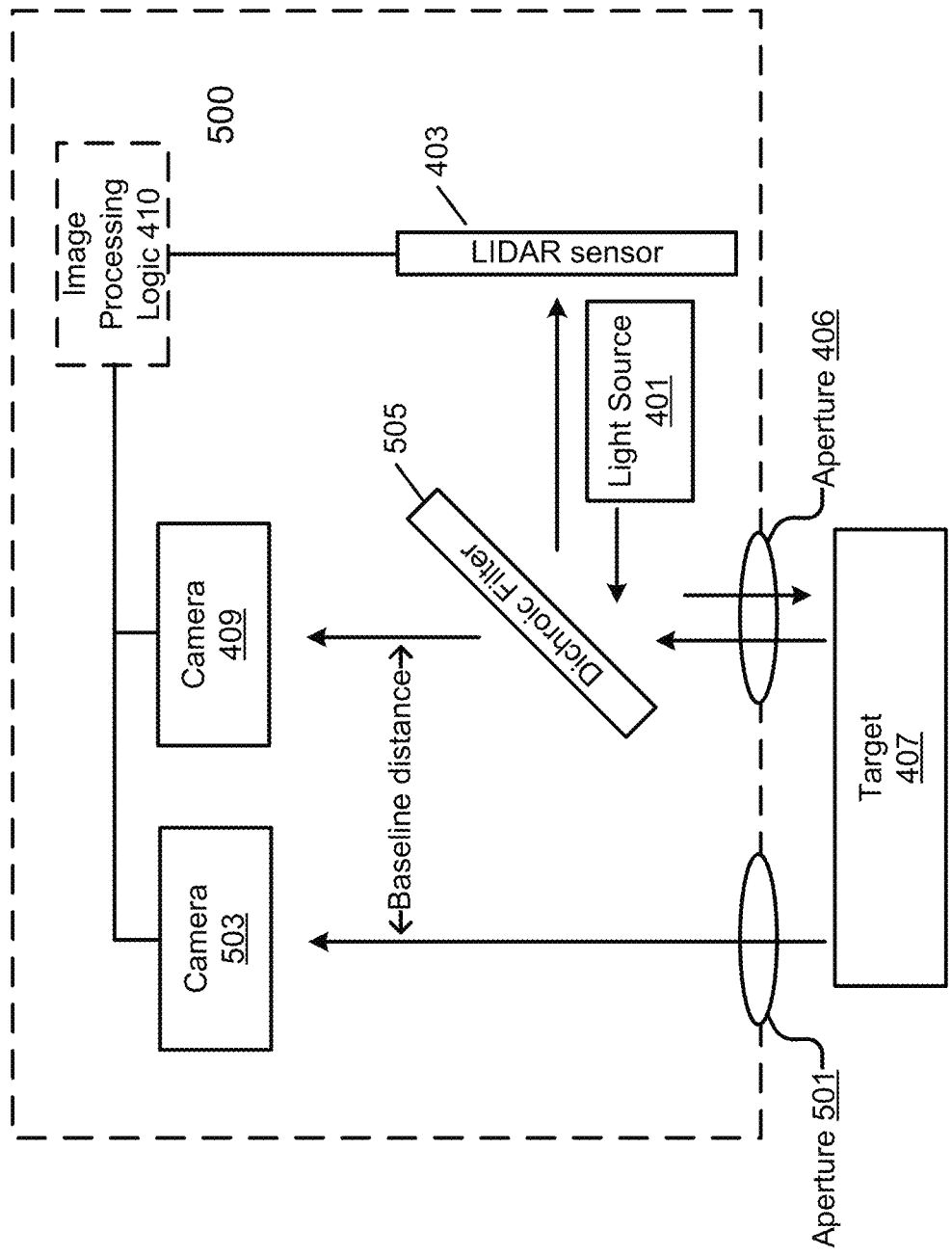
FIG. 4 is a diagram illustrating an example of a LIDAR system used with an autonomous vehicle according to another embodiment.

FIG. 4 is a diagram illustrating an example of a LIDAR system used with an autonomous vehicle according to another embodiment. Referring to FIG. 4, LIDAR device 500 is similar to LIDAR device 400 of FIG. 3. LIDAR device 500 includes dichroic filter 505 which may be customized to reflect approximately 905 nm light and pass through visible optical lights so to swap the placements of LIDAR sensor 403 and camera 409. In addition, LIDAR device 500 may include aperture 501 and camera 503. Camera 503 can capture a third image from optical lights passing through aperture 501 such that camera 409 and camera 503 can form a stereo pair. The stereo images captured by cameras 409 and 503 can be applied a stereo object segmentation algorithm based on disparity information (e.g., any mismatches between the stereo images) to determine a stereo depth image (e.g., a 1D distance depth image similar to an image generated a LIDAR sensor). The stereo depth image can supplement a distance depth image sensed by LIDAR sensor 403. In one embodiment, image processing logic 410 can apply, for each pixel or its corresponding pixel, a lowest value function to the stereo or stereo depth image and the LIDAR depth image. In another embodiment, image processing logic can apply, for each pixel or its corresponding pixel, an average function to the stereo or stereo depth image and the LIDAR depth image.

Figure 5:
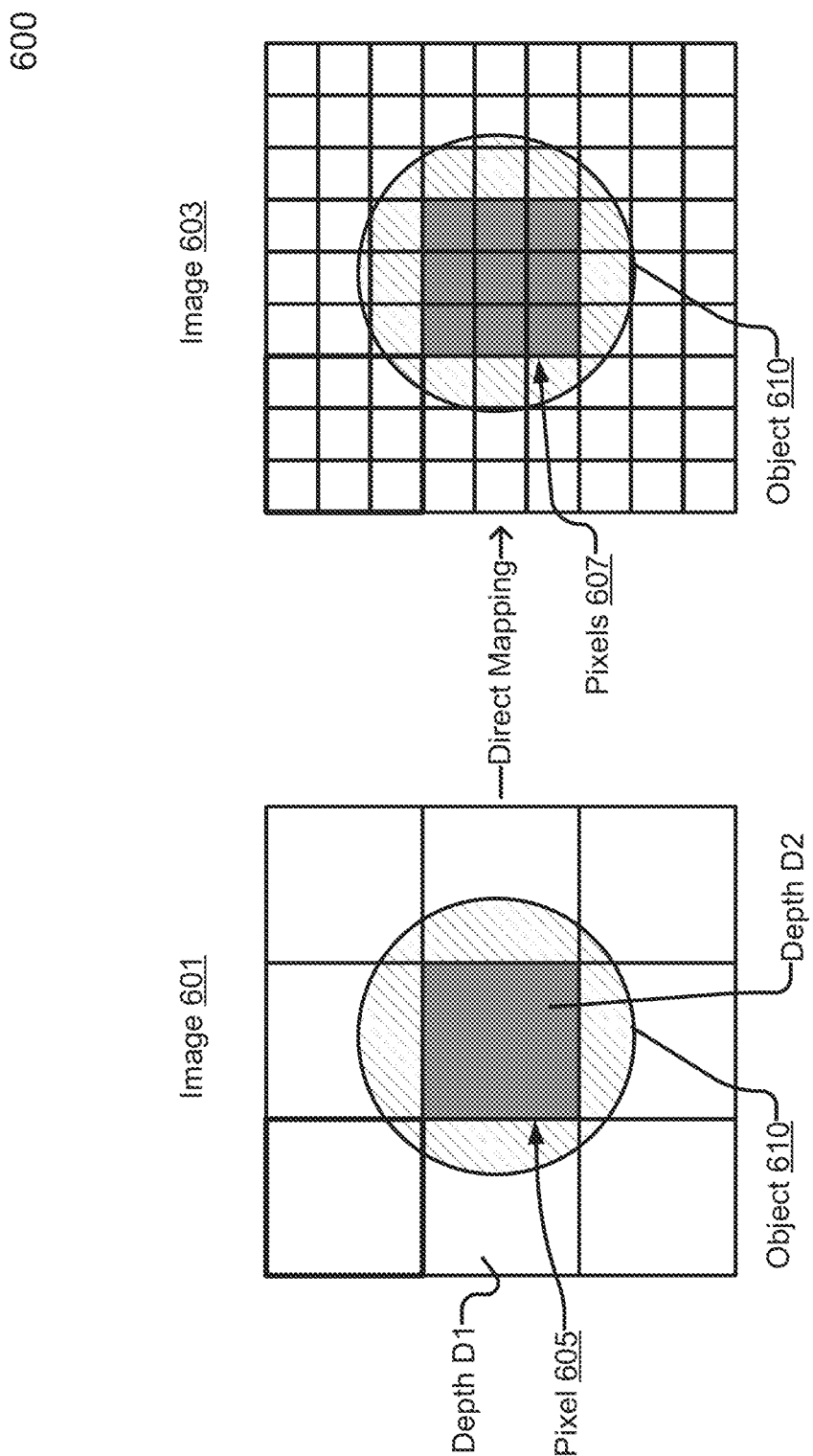
FIG. 5 is a diagram illustrating a direct mapping for a LIDAR image and a camera image according to one embodiment.

FIG. 5 is a diagram illustrating a direct mapping for a LIDAR image and a camera image according to one embodiment. A LIDAR image typically has a lower resolution than an image captured by a camera. For example, a LIDAR image can have a pixel count of 8 by 16 pixels while a RGB image captured by a camera can have 1920 by 1080 pixels. Each pixel of a LIDAR image includes data indicating a distance depth between a target and the LIDAR sensor. Each pixel of a RGB image includes data representing RGB values of the target. In one embodiment, image processing logic 410 of FIG. 3 maps a LIDAR image onto a RGB image to generate a 3D image, e.g., a RGB two-dimensional image with a third dimension having a depth information. For example, the generated 3D image can include four channels (e.g., R, G, B, and depth). Referring to FIG. 5, for the purpose of illustration, image 601 is a 3 by 3 pixels LIDAR image, and RGB image 603 has 9 by 9 pixels. Object 610 is imposed onto images 601-603 for purposes of illustration. In this example, image 601 has one pixel 605 with depth D2 while the rest of the pixels has depth D1. The D2 and D1 image depths may represent a LIDAR sensor sensing object 610 and a background respectively. In one embodiment, since the LIDAR image has a lower resolution, each pixel of image 601 is directly mapped onto one or more pixels of image 603. As illustrated in this example, pixel 605 with depth D2 is mapped onto 3 by 3 pixels 607 of image 603. The rest of the pixels of image 601 has depth D1, and are mapped to corresponding pixels on image 603. That is, each of the nine pixels 607 would have the same depth as pixel 605. With the direct mapping technique, the computational load requirement is minimal, however, the perceived depth information may be pixelated, i.e., depth mapping information of object 610 is not accuracy at the contours of object 610.

Figure 6:
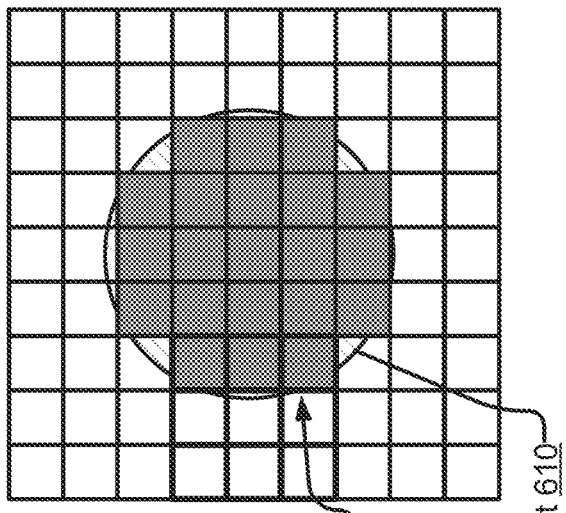
FIG. 6 is a diagram illustrating an indirect mapping for a LIDAR image and a camera image according to one embodiment.
Figure 6:
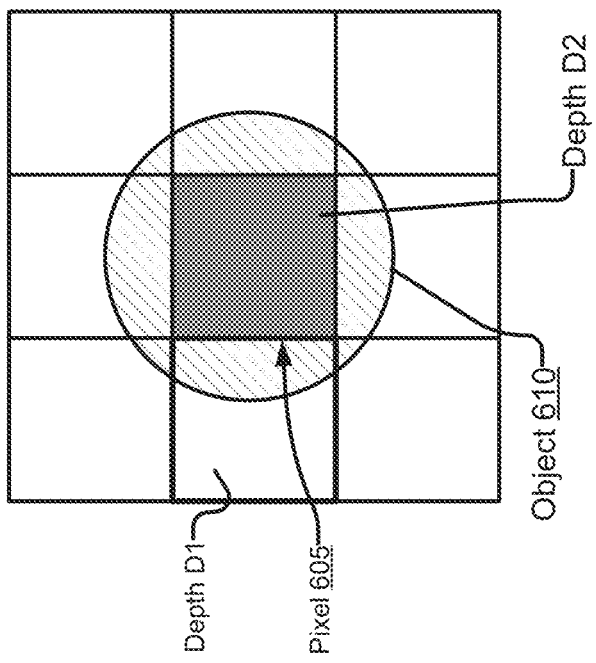

FIG. 6 is a diagram illustrating an indirect mapping for a LIDAR image and a camera image according to one embodiment. In one embodiment, image processing logic 410 maps LIDAR image 601 onto RGB image 703 using a semantic segmentation algorithm. For the purpose of illustration, a 3 by 3 pixels, image 601 is mapped onto image 703 having a pixel count of 9 by 9 pixels. Here, image 703 is first applied a semantic segmentation algorithm, e.g., a deep-learning algorithm (as part of algorithms/models 124 of FIG. 1) to detect objects perceived by RGB image 703. In this example, image processing logic detects object 610 based on image 703. Image processing logic maps image 601 onto image 703 based on the detected information, e.g., object 610. Instead of a directly mapping, the contours of object 610 is traced with depth D2. Thus, the perceived depth information of a generated 3D image using semantic segmentation increases the mapping accuracy.

In some embodiments, a LIDAR image is mapped onto stereo RGB images generated by a stereo camera setup (e.g., two cameras situated relatively apart). In this scenario, image processing logic, such as image processing logic 410, can first apply a stereo segmentation algorithm (as part of algorithms/models 124 of FIG. 1) to the stereo RGB images to generate a stereo depth image (e.g., a 1D distance depth image similar to a LIDAR image). The 1D distance depth image can merge with RGB image to form a RGB-depth image. An RGB-depth image can include four channels (e.g., three color (R, G, and B) channels, and a fourth channel of distance depth which is generated by a stereo segmentation algorithm).

Here, the stereo depth information (e.g., distance depth channel) has a higher resolution (e.g., 81 pixels count in an exemplary image such as image 703 of FIG. 6) than the LIDAR image (e.g., 9 pixels count in an exemplary image such as image 601 of FIG. 6) while the LIDAR image generally has a higher accuracy. In one embodiment, image processing logic can generate an image channel based on, for each pixel or its corresponding pixel, a lowest value function of the stereo depth image and the LIDAR depth image. In another embodiment, image processing logic can generate an image channel based on, for each pixel or its corresponding pixel, an average function of the stereo depth image and the LIDAR depth image. Since a RGB image contains 2D color information while a LIDAR image contains only distance or depth information, by combining the RGB information and the distance information, a 3D LIDAR image is generated.

Figure 7:
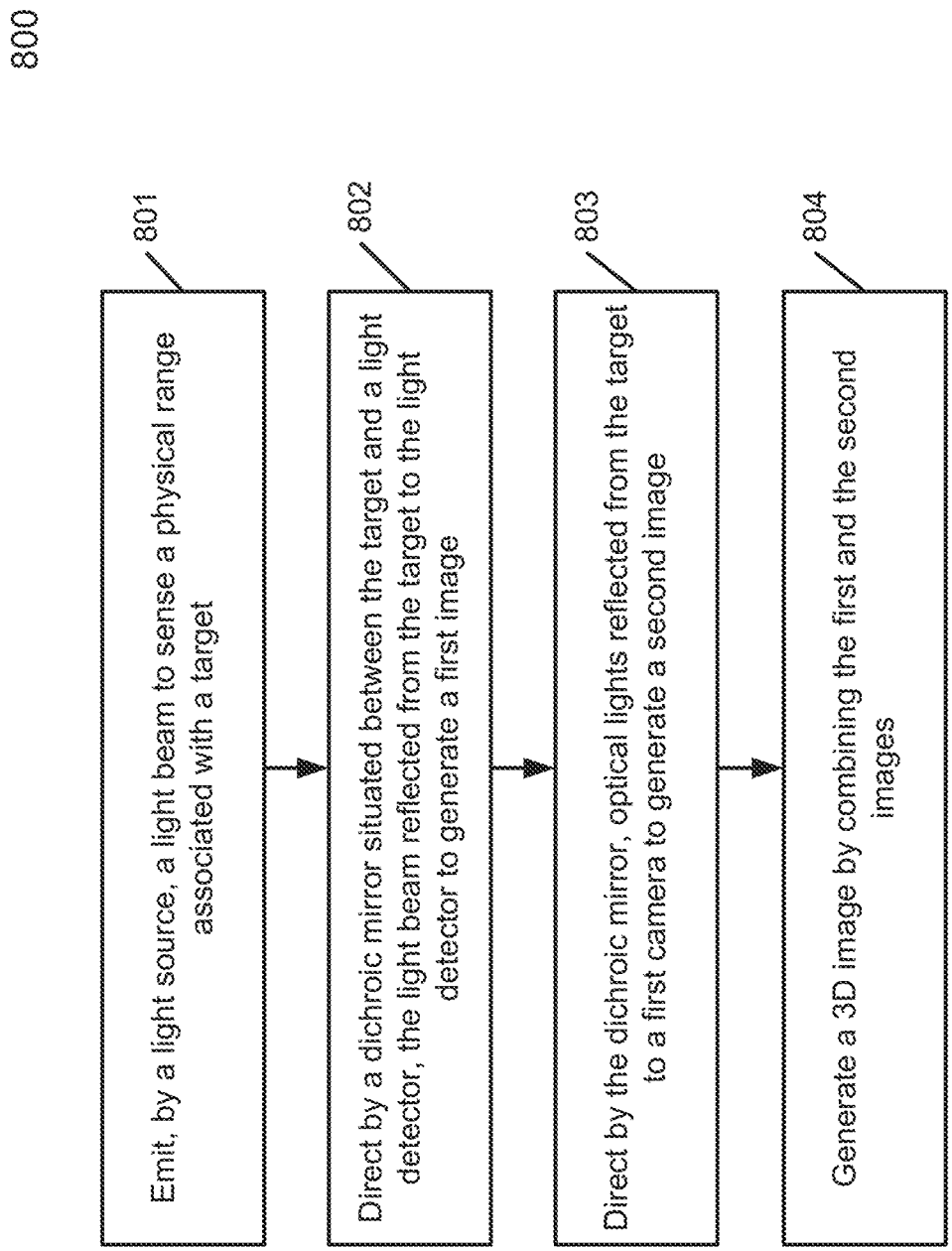
FIG. 7 is a flow diagram illustrating a process of operating a LIDAR system according to one embodiment.

FIG. 7 is a flow diagram illustrating a process of operating a LIDAR system according to one embodiment. Process 800 can be performed by processing logic which may include hardware, software, or a combination thereof. For example, process 800 may be performed by a 3D LIDAR device as shown in FIGS. 3 and 4. Referring to FIG. 7, in operation 801, a light source generates and emits a light beam to sense a physical range associated with a target. In operation 802, a dichroic mirror situated between the target and a light detector directs the light beam reflected from the target to the light detector to generate a first image. In operation 803, the dichroic mirror directs optical lights reflected from the target to a first camera to generate a second image. In operation 804, processing logic generates a 3D image based on the first and the second images.

In one embodiment, the 3D image is generated by mapping one or more pixels of the first image directly onto one or more pixels of the second image, where a pixel density count of the first image is different from a pixel density count of the second image. In one embodiment, the 3D image is generated by applying a semantic segmentation algorithm to the second image to classify objects perceived in the second image and mapping one or more pixels of the first image indirectly onto one or more pixels of the second image based on the perceived objects.

In one embodiment, a zoom lens situated between the target and the dichroic mirror enlarges or reduces a perceived field of view of the light detector. In one embodiment, a scanning component situated between the target and the dichroic mirror increases a pixel density count of the first image. In one embodiment, processing logic perceives a disparity of the second image and a third image generated by a second camera, where the first and the second cameras forms a stereo camera pair. In another embodiment, the disparity is perceived by applying a stereo segmentation algorithm to the second and the third images.

Referring back to FIG. 1, according to one embodiment, perception and planning system 110 includes, but is not limited to, a localization module, a perception module, a prediction module, a decision module, a planning module, a routing module, and a control module (not shown). The localization module determines a current location of an autonomous vehicle (e.g., leveraging GPS unit 212) and manages any data related to a trip or route of a user. The localization module (also referred to as a map and route module) manages any data related to a trip or route of a user. A user may log in and specify a starting location and a destination of a trip, for example, via a user interface. The localization module communicates with other components of the autonomous vehicle, such as map and route information, to obtain the trip related data. For example, the localization module may obtain location and route information from a location server and a map and POI (MPOI) server. A location server provides location services and an MPOI server provides map services and the POIs of certain locations, which may be cached as part of the map and route information. While the autonomous vehicle is moving along the route, the localization module may also obtain real-time traffic information from a traffic information system or server.

Based on the sensor data provided by sensor system 115 and localization information obtained by the localization module, a perception of the surrounding environment is determined by the perception module. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

The perception module may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. The perception module can also detect objects based on other sensors data provided by other sensors such as a radar and/or LIDAR as described above.

For each of the objects, the prediction module predicts what the object will behave under the circumstances. The prediction is performed based on the perception data perceiving the driving environment at the point in time in view of a set of map/rout information and traffic rules. For example, if the object is a vehicle at an opposing direction and the current driving environment includes an intersection, the prediction module will predict whether the vehicle will likely move straight forward or make a turn. If the perception data indicates that the intersection has no traffic light, the prediction module may predict that the vehicle may have to fully stop prior to enter the intersection. If the perception data indicates that the vehicle is currently at a left-turn only lane or a right-turn only lane, the prediction module may predict that the vehicle will more likely make a left turn or right turn respectively.

For each of the objects, the decision module makes a decision regarding how to handle the object. For example, for a particular object (e.g., another vehicle in a crossing route) as well as its metadata describing the object (e.g., a speed, direction, turning angle), the decision module decides how to encounter the object (e.g., overtake, yield, stop, pass). The decision module may make such decisions according to a set of rules such as traffic rules or driving rules, which may be stored in a persistent storage device.

The routing module is configured to provide one or more routes or paths from a starting point to a destination point. For a given trip from a start location to a destination location, for example, received from a user, the routing module obtains route and map information 311 and determines all possible routes or paths from the starting location to reach the destination location. The routing module may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to the decision module and/or the planning module. The decision module and/or the planning module examine all of the possible routes to select and modify one of the most optimal route in view of other data provided by other modules such as traffic conditions from the localization module, driving environment perceived by the perception module, and traffic condition predicted by the prediction module. The actual path or route for controlling the ADV may be close to or different from the reference line provided by the routing module dependent upon the specific driving environment at the point in time.

Based on a decision for each of the objects perceived, the planning module plans a path or route for the autonomous vehicle, as well as driving parameters (e.g., distance, speed, and/or turning angle), using a reference line provided by the routing module as a basis. That is, for a given object, the decision module decides what to do with the object, while the planning module determines how to do it. For example, for a given object, the decision module may decide to pass the object, while the planning module may determine whether to pass on the left side or right side of the object. Planning and control data is generated by the planning module including information describing how the vehicle would move in a next moving cycle (e.g., next route/path segment). For example, the planning and control data may instruct the vehicle to move 10 meters at a speed of 30 mile per hour (mph), then change to a right lane at the speed of 25 mph.

Based on the planning and control data, the control module controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, the planning module plans a next route segment or path segment, for example, including a target position and the time required for the ADV to reach the target position. Alternatively, the planning module may further specify the specific speed, direction, and/or steering angle, etc. In one embodiment, the planning module plans a route segment or path segment for the next predetermined period of time such as 5 seconds. For each planning cycle, the planning module plans a target position for the current cycle (e.g., next 5 seconds) based on a target position planned in a previous cycle. The control module then generates one or more control commands (e.g., throttle, brake, steering control commands) based on the planning and control data of the current cycle.

Note that the decision module and planning module may be integrated as an integrated module. The decision module/planning module may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The decision module/planning module may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
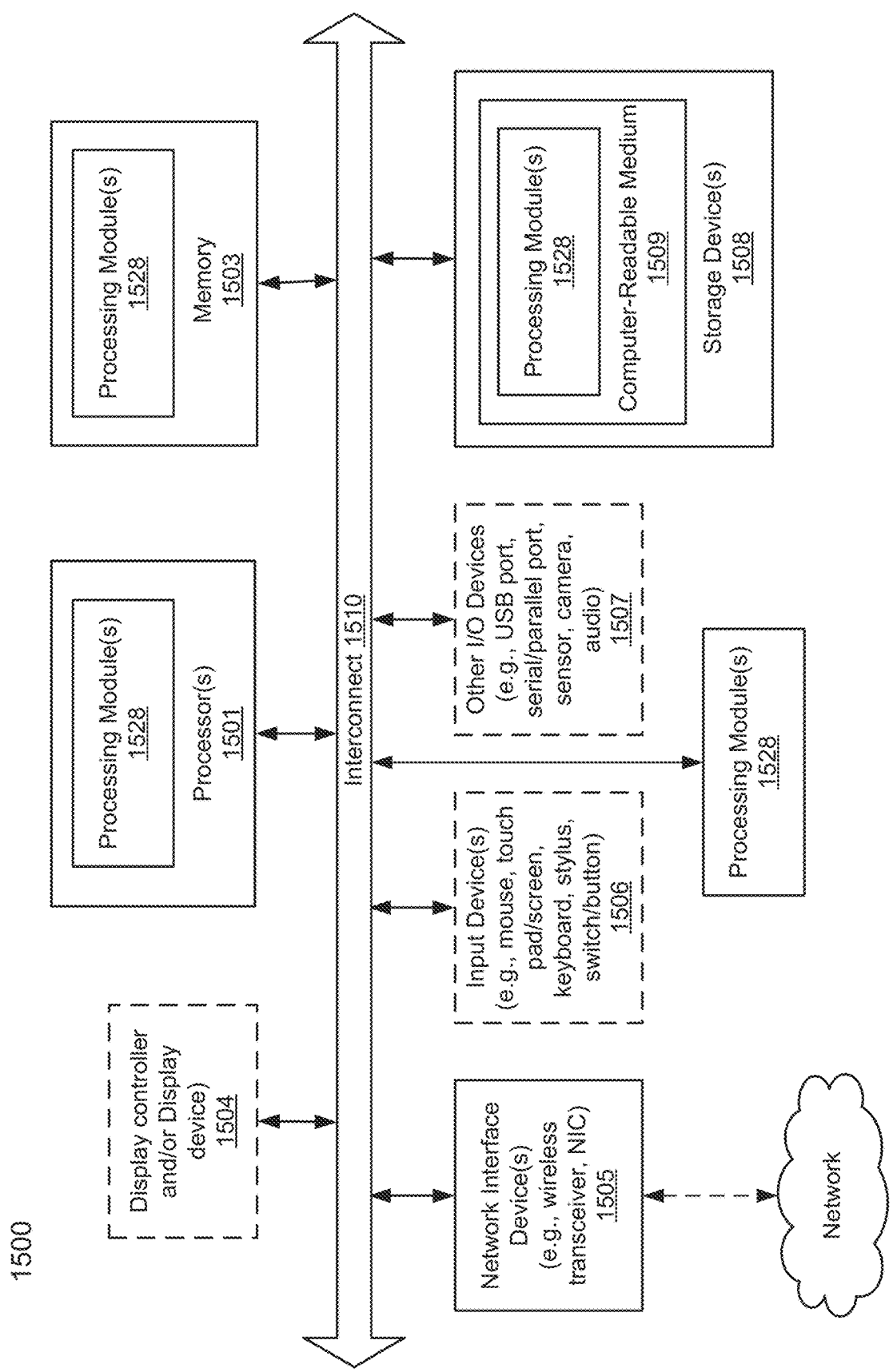
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, sensor system 115 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, image processing logic of FIGS. 4-5, sensor system 115 of FIG. 2. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A three-dimensional (3D) light detection and range (LIDAR) device of an autonomous driving vehicle, the LIDAR device comprising:
   a light source to emit a light beam to sense a physical range associated with a target;
   a light detector to receive at least a portion of the light beam reflected from the target;
   a first camera;
   a dichroic mirror situated between the target and the light detector, the dichroic mirror configured to direct light to both the light detector and the first camera, wherein the dichroic mirror directs the light beam reflected from the target to the light detector to generate a first image, wherein the dichroic mirror further directs optical lights reflected from the target to the first camera to generate a second image, wherein the optical lights and the light beam are from different sources, wherein the light beam from the light source is reflected by the dichroic mirror from the light source to the target;
   a second camera situated relative to the first camera to form a stereo camera pair, the second camera to generate a third image to perceive a disparity from the second image by applying a stereo segmentation algorithm to the second and the third images; and
   an image processing logic coupled to the light detector and the first camera to combine the first image and the second image to generate a 3D image, wherein the 3D image is utilized to perceive a driving environment surrounding the autonomous driving vehicle, and wherein the 3D image is generated by mapping each pixel of the first image onto one or more pixels of the second image, wherein a pixel density count of the first image is different from a pixel density count of the second image, wherein one pixel of the first image representing an object perceived in the first image is mapped to multiple pixels of the second image, and wherein the 3D image is generated by applying a semantic segmentation algorithm to the second image to classify objects perceived in the second image and mapping one or more pixels of the first image indirectly onto one or more pixels of the second image based on the perceived objects,
   wherein the image processing logic generates a depth for each pixel by applying an average function of depth values produced from a stereo depth image and a LIDAR depth image, wherein the stereo depth image is a RGB image containing three channels of 2D color information and a fourth channel of distance depth, and wherein the LIDAR image contains distance or depth information without color information.

2. The device of claim 1, further comprising a zoom lens situated between the target and the dichroic mirror to enlarge or reduce a perceived field of view of the light detector.

3. The device of claim 1, further comprising a scanning component situated between the target and the dichroic mirror to increase a pixel density count of the first image.

4. A machine-implemented method for operating a 3D LIDAR device of an autonomous driving vehicle, the method comprising:
    emitting, by a light source, a light beam to sense a physical range associated with a target;
    reflecting, by a dichroic mirror situated between the light source and the target, the light beam to the target;
    directing, by the dichroic mirror situated between the target and a light detector, the light beam reflected from the target to the light detector to generate a first image;
    directing, by the dichroic mirror, optical lights reflected from the target to a first camera to generate a second image, wherein the optical lights and the light beam are from different sources;
    generating a 3D image based on the first and the second images, wherein the 3D image is utilized to perceive a driving environment surrounding the autonomous driving vehicle, and wherein the 3D image is generated by mapping each pixel of the first image onto one or more pixels of the second image, wherein a pixel density count of the first image is different from a pixel density count of the second image, wherein one pixel of the first image representing an object perceived in the first image is mapped to multiple pixels of the second image, and wherein the 3D image is generated by applying a semantic segmentation algorithm to the second image to classify objects perceived in the second image and mapping one or more pixels of the first image indirectly onto one or more pixels of the second image based on the perceived objects;
    perceiving a disparity of the second image and a third image generated by a second camera, wherein the first and the second cameras forms a stereo camera pair, wherein the disparity is perceived by applying a stereo segmentation algorithm to the second and the third images; and
    generating a depth for each pixel by applying an average function of depth values produced from a stereo depth image and a LIDAR depth image, wherein the stereo depth image is a RGB image containing three channels of 2D color information and a fourth channel of distance depth, and wherein the LIDAR image contains distance or depth information without color information.

5. The method of claim 4, further comprising enlarging or reducing a perceived field of view of the light detector via a zoom lens situated between the target and the dichroic mirror.

6. The method of claim 4, further comprising increasing a pixel density count of the first image via a scanning component situated between the target and the dichroic mirror.

7. An autonomous driving vehicle, comprising:
    a light detection and range (LIDAR) device, wherein the LIDAR device comprises
        a light source to emit a light beam to sense a physical range associated with a target,
        a light detector to receive at least a portion of the light beam reflected from the target,
        a first camera,
        a dichroic mirror situated between the target and the light detector, the dichroic mirror configured to direct light to both the light detector and the first camera, wherein the dichroic mirror directs the light beam reflected from the target to the light detector to generate a first image, wherein the dichroic mirror further directs optical lights reflected from the target to the first camera to generate a second image, wherein the optical lights and the light beam are from different sources, wherein the light beam from the light source is reflected by the dichroic mirror from the light source to the target, and
        a second camera situated relative to the first camera to form a stereo camera pair, the second camera to generate a third image to perceive a disparity from the second image by applying a stereo segmentation algorithm to the second and the third images;
    an image processing logic coupled to the light detector and the first camera to combine the first image and the second image to generate a 3D image, wherein the image processing logic generates a depth for each pixel by applying an average function of depth values produced form a stereo depth image and a LIDAR depth image, wherein the stereo depth image is a RGB image containing three channels of 2D color information and a fourth channel of distance depth, and wherein the LIDAR image contains distance or depth information without color information; and
    a perception and planning system coupled to the LIDAR device and the image processing logic to perceive a driving environment surrounding the autonomous driving vehicle and to control the autonomous driving vehicle to navigate the driving environment, and wherein the 3D image is generated by mapping each pixel of the first image onto one or more pixels of the second image, wherein a pixel density count of the first image is different from a pixel density count of the second image, wherein one pixel of the first image representing an object perceived in the first image is mapped to multiple pixels of the second image, and wherein the 3D image is generated by applying a semantic segmentation algorithm to the second image to classify objects perceived in the second image and mapping one or more pixels of the first image indirectly onto one or more pixels of the second image based on the perceived objects.

8. The autonomous driving vehicle of claim 7, wherein the LIDAR device further comprises a zoom lens situated between the target and the dichroic mirror to enlarge or reduce a perceived field of view of the light detector.

9. The autonomous driving vehicle of claim 7, wherein the LIDAR device further comprises a scanning component situated between the target and the dichroic mirror to increase a pixel density count of the first image.

10. The device of claim 1, wherein the light source and the light detector are an integrated unit.

11. The method of claim 4, wherein the light source and the light detector are an integrated unit.

12. The autonomous driving vehicle of claim 7, wherein the light source and the light detector are an integrated unit.

* * * * *